United States Patent [19]

König et al.

[11] E Re. 28,781

[45] Reissued Apr. 20, 1976

[54] CARBOHYDRATE AGENT OF HIGH WATER RETENTION POWER, PROCESS OF MAKING SAME, AND COMPOSITION CONTAINING SAME

[75] Inventors: Joachim König; Günter Padberg, both of Hamburg-Rahlstadt, Germany

[73] Assignee: Byk Gulden Lomberg Chemische Fabrik GmbH, Constance, Germany

[22] Filed: Apr. 23, 1973

[21] Appl. No.: 354,157

[30] Foreign Application Priority Data

Aug. 19, 1966 Germany.....C 39,914

Related U.S. Patent Documents

Reissue of:

[64] Patent No.: 3,578,655
Issued: May 11, 1971
Appl. No.: 661,110
Filed: Aug. 16, 1967

[52] U.S. Cl...... 424/361; 260/209 R; 424/70; 424/73; 424/180; 424/365

[51] Int. Cl.[2]..... A61K 7/02; C07H 3/02; C13K 1/00

[58] Field of Search..... 260/209 R; 424/180, 424/361

[56] References Cited

UNITED STATES PATENTS

| | | | |
|---|---|---|---|
| 2,609,368 | 9/1952 | Gaver | 260/209 R |
| 2,609,370 | 9/1952 | Gaver et al. | 260/209 R |
| 3,074,927 | 1/1963 | Saltman et al. | 260/209 R |
| 3,094,517 | 6/1963 | Stanley | 260/209 R |
| 3,231,472 | 1/1966 | Jacobi et al. | 260/209 R |
| 3,256,270 | 6/1966 | Haack et al. | 260/209 |
| 3,312,683 | 4/1967 | Farkas et al. | 260/209 |
| 3,431,253 | 3/1969 | Parrish | 260/209 |
| 3,450,690 | 6/1969 | Gibbons et al. | 260/210 |
| 3,859,436 | 1/1975 | Jacobi | 424/180 |

OTHER PUBLICATIONS

Wolfrom: "Advances in Carbohydrate Chemistry," Vol. 13, 1958, pp. 63–69, Academic Press Inc., New York, N.Y.

*Primary Examiner*—Johnnie R. Brown
*Attorney, Agent, or Firm*—Berman, Aisenberg & Platt

[57] ABSTRACT

The reaction product of a carbohydrate such as a sugar, with an alkaline agent such as an alkali metal hydroxide solution has a high water retention power which is about as high as that of the neutral skin sugar fraction obtained by extraction of the stratum corneum and far superior to that of hygroscopic compounds such as glycerol, glycols, the water-soluble amino acid fraction of the skin and others which, although they attract water, permit rapid evaporation thereof.

18 Claims, 1 Drawing Figure

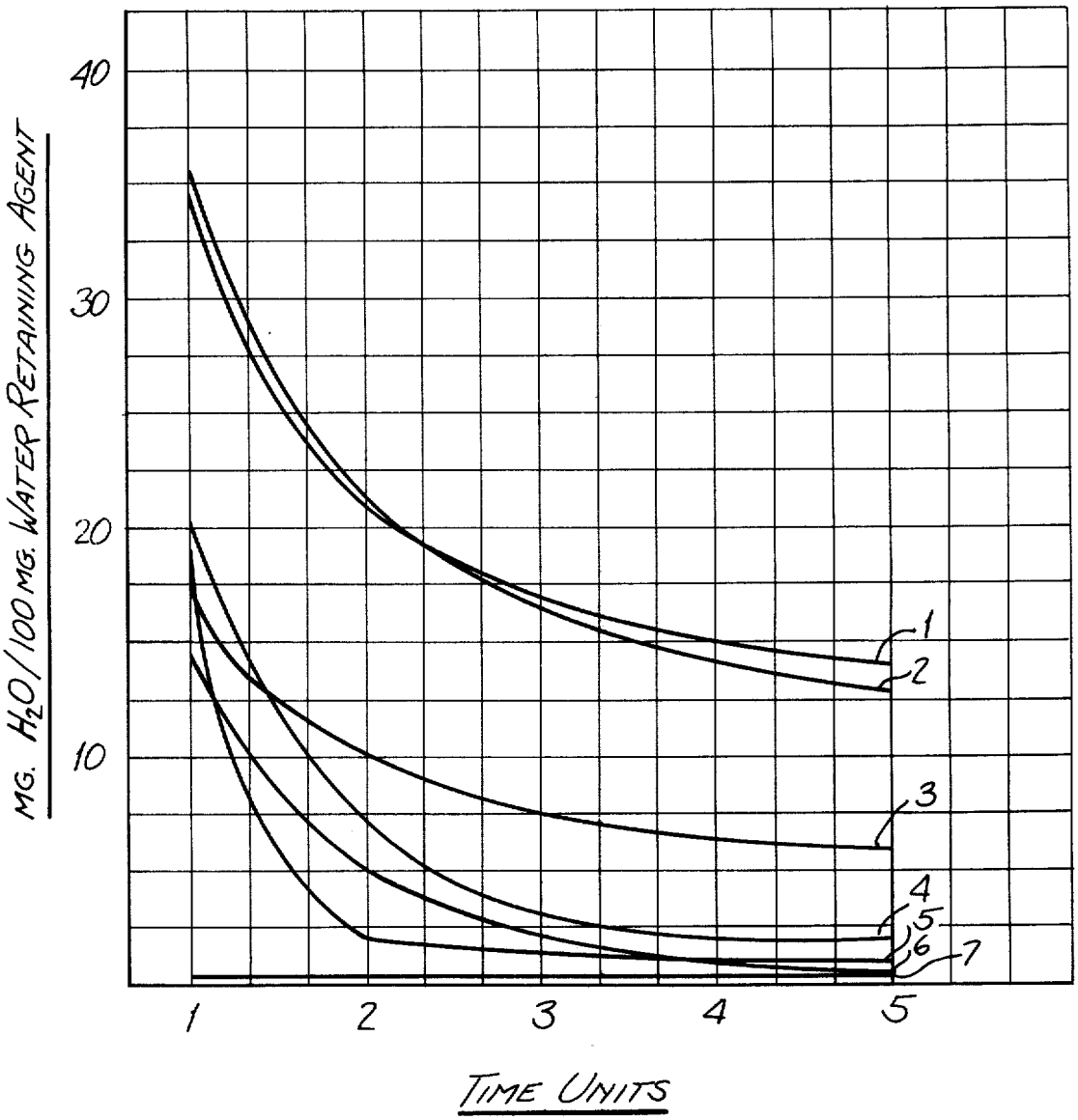
INVENTORS
JOACHIM KOENIG
GUENTER PADBERG

CARBOHYDRATE AGENT OF HIGH WATER RETENTION POWER, PROCESS OF MAKING SAME, AND COMPOSITION CONTAINING SAME

Matter enclosed in heavy brackets [ ] appears in the original patent but forms no part of this reissue specification; matter printed in italics indicates the additions made by reissue.

The preferred reaction products of a sugar with an alkaline agent are the reaction products obtained on prolonged contact of glucose and/or lactose with an alkali metal hydroxide solution, especially a sodium hydroxide solution at room temperature for several weeks. They are preferably used in mixture in a proportion of about 95 parts of the glucose reaction product with about 5% of the lactose reaction product.

The composition of such reaction products is similar to that of the neutral skin sugar fraction and is characterized by a content of mannose, fructose, glucose, galactose, lactose, and the degradation product of lactose.

These reaction products are incorporated, preferably in amounts of about 0.1% to about 5%, into cosmetic compositions as they are used in the treatment of the skin such as skin creams, skin lotions, cleansing emulsions, after-shave lotions, face lotions, hair tonics, and others. The result of their application to the skin is an improvement in the smoothness and flexibility of the skin due to its improved water retention, thereby eliminating, or retarding, the appearance of aging of the skin.

The present invention relates to a cosmetic composition and more particularly to a cosmetic preparation containing an agent capable of retaining water in the human skin, to a process of producing such a composition and agent and of using same.

It is known that the pliancy and smoothness of the skin, its function, and its appearance is dependent on the water content of the horny layer, i.e. the stratum corneum of the epidermis whereby said water content is determined by the content of said horny layer of certain specific water-soluble components of the skin. More particularly the amino acid fraction has been identified as hygroscopically effective component.

It is also known to add hygroscopic agents which are foreign to the body such as glycerol, glycols, sorbitol, and the like to cosmetic compositions, salves, ointments, and the like cosmetic and pharmaceutical preparations in order to keep the skin smooth, flexible, and free of wrinkles. Likewise, hygroscopic agents which are derived from the human body, such as the hygroscopic amino acids, salts of amino acids, mixtures of pentoses and amino acids, certain proteinaceous compounds, and others produce the same effect, i.e. they attract water. However, all these agents have the great disadvantage that they do not prevent, or even retard, rapid evaporation of the water, when applied to the skin.

It is one object of the present invention to provide an agent which, when applied to the skin, causes retention of the water in the horny layer of the skin and thus establishes, and assures, the normal water content of the horny layer of the skin, thereby eliminating dryness, coarseness, and roughness of the skin and to counteract the appearance of aging of the skin as far as it is based on dryness of the horny layer.

Another object of the present invention is to provide a cosmetic composition which improves the water retention of the horny layer of the skin and thus eliminates, or considerably retards, dryness and the appearance of aging of the skin.

A further object of the present invention is to provide a simple and effective process of producing such an agent capable of retaining the water in the horny layer of the skin and thus of eliminating drying out [ and the appearance of aging ] of the skin.

Still another object of the present invention is to provide a process of treating the human skin so as to improve, by its water retaining power, its smoothness, flexibility, and pliancy and to prevent premature aging due to the horny layer of the skin becoming dry and inflexible.

Other objects of the present invention and advantageous features thereof will become apparent as the description proceeds.

In principle the present invention is concerned with the production of a neutral carbohydrate or sugar fraction which is obtained from the horny layer of the human skin and which represents the water retaining agent of said horny layer or stratum corneum. It is obtained by extracting the human skin and especially its horny layer.

According to an important further embodiment of the present invention a reaction product which is capable of retaining water on application to the skin is obtained by the action of an alkaline agent, such as an alkali metal hydroxide solution and especially of sodium hydroxide solution, on a carbohydrate or sugar. The preferred reaction products are those which are obtained by the action of an alkali metal hydroxide solution on glucose and/or lactose. A mixture composed of 19 parts of the reaction product of sodium hydroxide solution on glucose and 1 part of the reaction product of sodium hydroxide solution on lactose is quite similar to the above mentioned neutral sugar fraction of the skin not only in its composition but also in its capacity to retain water.

It was found by comparative tests such as analysis and testing for water retention power, that the reaction product of an alkali metal hydroxide solution on a sugar and especially on glucose and lactose is capable of replacing or substituting the effect, i.e. the ability of keeping the skin smooth and flexible, of the neutral skin sugar fraction when applying said reaction product to the skin and incorporating it into the horny layer as the effective component of cosmetic compositions, for instance, in the form of oil-in-water emulsions or of water-in-oil emulsions or in the form of sols or gels.

The attached drawing illustrates the water retention power of the reaction product according to the present invention in its preferred embodiment, i.e. the reaction products of glucose and lactose with sodium hydroxide solution, as compared with the water retention power of the neutral sugar fraction obtained from skin and with hygroscopic agents as they are conventionally used in cosmetic preparations. In said drawing the water retention power of said agents is shown by curves whereby the ordinate indicates the water retention in mg. of water for 100 mg. of the agent while the abscissa indicates the time units as defined hereinafter.

The following agents have been tested for their water retention power and the following curves have been plotted from the results obtained:

(1) Reaction product of glucose and lactose with sodium hydroxide solution according to the present invention.
(2) Neutral sugar fraction obtained from skin according to the present invention.
(3) Fat-free, water-soluble extract of the horny layer of the skin.
(4) Glycerol.
(5) Glucose.
(6) Water-soluble amino acid fraction of the horny layer of the skin.
(7) Lactose.

The water retention of said agents was determined by exposing the agent to be tested with added water in the proportion, by weight, of 1:3 to a vacuum of about 12 mm. Hg and weighing the agent after each time unit of exposure. One time unit corresponds to an exposure time to the water jet vacuum for 5 minutes and to a time of contact of the mixture with the alkaline agent for 90 minutes in such a vacuum, i.e. all in all to an exposure time of 95 minutes in a water jet vacuum. The tests were carried out at constant room temperature.

These curves clearly show that the reaction product of glucose and lactose with sodium hydroxide solution as well as the neutral sugar fraction obtained from skin has a water retention power which is at least twice as high as that of the other agents, and after exposure to a vacuum of 12 mm. Hg for five time units is as least seven times as high as that of the other tested agents 4 to 7 and still at least twice as high as that of extract 3.

While, heretofore, mainly hygroscopic fractions of the water-soluble components of the horny layer of the skin have been produced and identified and have been used in cosmetic compositions, the agent according to the present invention, i.e. the reaction product of a carbohydrate and preferably of glucose and lactose with an alkali metal hydroxide solution, has the property of retaining surprisingly large amounts of water and thus of replacing or substituting the water-soluble, neutral sugar fraction of the skin and of taking over the function of said fraction, namely to improve water retention in the horny layer of the skin.

Cosmetic compositions which contain said reaction products of carbohydrates or sugars with alkaline agents and especially with alkali metal hydroxide solutions according to the present invention, said reaction products being similar to the above-mentioned highly effective, physiological water retaining agent of the horny layer of the skin, *are* useful to reestablish and to preserve the normal water content of said horny layer by increasing its water retention power. Thereby, the dryness, inflexibility, and coarseness of the skin due to a deficiency of the horny layer of the neutral sugar fraction can be eliminated and, as a result thereof, aging of the skin as far as it is due to dryness of the horny layer is counteracted or retarded.

According to another embodiment of the present invention the new and valuable water retaining reaction products are obtained by allowing aqueous solutions of alkaline reaction, especially aqueous solutions of alkali metal hydroxides, preferably sodium hydroxide solutions, to act upon carbohydrates, especially upon sugars. Preferably alkali and metal hydroxide solutions in water are used in this reaction. Thereby reaction products are obtained which have a high water retention power and which are similar in their composition to the neutral sugar fraction of the skin. Said neutral sugar fraction of the skin will be designated hereinafter and in the claims as skin sugar fraction. By continually sampling and analytically testing the reaction products during the reaction it has been found that such a reaction product of high water retention power is obtained when exposing the sugar to the action of the alkaline solution, such as an alkali metal hydroxide solution for several weeks whereby preferably a predetermined amount of sodium hydroxide solution or, respectively, another alkaline solution is consumed. *Desired reaction products are obtained, e.g., when the analytical testing reveals no further increase in water-retention power.*

The reaction is preferably carried out at room temperature or at slightly increased temperature, for instance, at 20°–25° C. The reaction may also be carried out at lower temperatures whereby it proceeds, of course, more slowly. Higher temperatures may also be used. However, undesirable discoloration of the reaction product may occur at such higher temperatures.

According to a preferred embodiment of the present invention the reaction out in an alkaline medium at a pH-range between about 9.0 and about 13.0. As soon as the pH-value decreases to a pH of 9.0 during the course of the reaction, further alkaline reagent such as alkali metal hydroxide solution is added to adjust the mixture to a pH of 13.0. Most preferably the reaction is carried out by adding the alkaline reactant solution, for instance, a 10% alkali metal hydroxide solution in portions to the aqueous solution of the sugar whereby preferably the alkaline agent is added in relatively small portions. The concentrations of the aqueous carbohydrate solution such as a sugar solution is preferably between about 20% and about 30%. A concentration of about 25% has proved to be especially suitable. A sugar concentration of about 50% should preferably not be exceeded.

The proportion, by weight, of glucose to alkali metal hydroxide solution is about 1000:6, when using sodium hydroxide solution while with lactose the amount of sodium hydroxide solution is preferably somewhat higher, i.e. the proportion, by weight, of lactose to sodium hydroxide solution is about 1000:14. It has been found that the amount of sodium hydroxide solution should preferably not exceed about 1% of the glucose charged and about 2% of the lactose charged.

The proportion of glucose to fructose in the skin sugar fraction has been found to be about 47:31. Preferably the proportion of alkaline solution to glucose is chosen in such a manner that, after reaction, the proportion of glucose to fructose is about 60:40, preferably 53:37. The progress of the fructose formation during reaction can readily be controlled by sugar analysis.

The reaction of lactose with the alkaline agent according to the present invention, i.e. the proportion of lactose to alkaline agent, is preferably carried out in such a manner that the reaction product contains lactose and its cleavage products in the proportion, by weight, between about 60:40 and about 40:60.

Of course, not only the proportion of the reactants, i.e. the sugar and the alkaline agent, but also the concentration of the reactants in the reaction solution is of importance for properly carrying out the reaction under the most favorable conditions. Preliminary tests permit readily to determine these optimum parameters.

After the reaction is completed, the pH-value of the reaction mixture is preferably adjusted to a slightly acid pH, for instance, by the addition of lactic acid.

The preferred procedure is to produce the reaction products of glucose and of fructose separately and to mix said reaction products in about the same proportion as they are present in the skin sugar fraction.

The following examples serve to illustrate the production of the reaction products of glucose and of lactose with the alkaline solutions without, however, limiting the same thereto.

EXAMPLE 1

1000 g. of glucose in its hydrate form ($1H_2O$) are dissolved in 4000 cc. of distilled water, 10 cc. of an aqueous 10% sodium hydroxide solution are added to said glucose solution while stirring. The mixture is allowed to stand in a closed container at a temperature of 22° C.±1° C. The initial pH-value of about 12.0 decreases in the course of the reaction. It is determined daily. As soon as it has decreased to a pH below 9.0, 10 cc. of 10% sodium hydroxide solution are added to the reaction mixture to reestablish the initital pH-value. Said addition of the sodium hydroxide solution is repeated until the desired composition of the reaction mixture as ascertained by sugar analysis has been attained. Usually 60 cc. of an aqueous 10% sodium hydroxide solution are consumed. When proceeding as described hereinabove, the required reaction is obtained after 24 days. The pH-value of the resulting reaction mixture is then adjusted to a pH of 6.0 by the addition of lactic acid.

The reaction mixture is stable at neutral and slightly acid pH-values. It is protected against microbial *especially bacterial decomposition by the addition of* and known preserving agents, by sterilizing, or by other known means and methods.

EXAMPLE 2

1000 g. of lactose are dissolved in 4000 cc. of distilled water. 60 cc. of an aqueous 10% sodium hydroxide solution are added thereto while stirring. The mixture is allowed to stand at 20° C.±1° C. in a closed container. The initial pH-value of the mixture of 13.0 decreases in the course of the reaction. It is determined daily. As soon as it has decreased to a pH below 9.0, 10 cc. of said 10% sodium hydroxide solution are added to adjust the pH-value of the mixture to the initial pH of about 13.0. The addition of 10% sodium hydroxide solution is repeated until the reaction product has the desired composition as determined by sugar analysis. A total amount of 140 cc. of 10% sodium hydroxide solution are consumed. Usually this result is achieved within 31 days when proceeding under the above given conditions. Thereafter, the pH-value is adjusted to a pH of 6.0 by the addition of lactic acid.

The resulting reaction product is stable at neutral and slightly acid pH-values. It is protected against microbial, especially bacterial decomposition by the addition of known preserving agents, by sterilizing, or by other known means and methods.

The water retaining agent according to the present invention in its preferred composition is prepared by mixing about 95% of the reaction product obtained according to Example 1 by the action of sodium hydroxide solution on glucose with about 5% of the reaction product obtained according to Example 2 by the action of sodium hydroxide solution on lactose. Such a preferred sugar reaction product which will be designated hereinafter and in the claims as "ZUK," has the following composition.

| Compound: | Percent |
|---|---|
| Not yet known reaction product designated as $U_2$ | 0.1 |
| Psicose | 0.5 |
| Glutose (most probably) | 0.2 |
| Mannose | 3.6 |
| Fructose | 37.0 |
| Glucose | 53.3 |
| Galactose | 1.3 |
| Degradation product of lactose | 0.9 |
| Lactose | 2.5 |

The skin sugar fraction, i.e. the water-soluble, neutral sugar fraction as obtained by extraction of skin with water has the following composition.

| Compound: | Percent |
|---|---|
| Compound $U_1$ the structure of which is not yet known but which is not a hexose | 4.7 |
| Psicose | 0.2 |
| Glutose (most probably) | 2.2 |
| Mannose | 3.0 |
| Fructose | 31.1 |
| Glucose | 46.7 |
| Galactose | 2.1 |
| Degradation product of lactose | 3.1 |
| Lactose | 6.5 |

The agent according to the preferred embodiment of the present invention of the hereinabove given composition is characterized by its high water retention power which, as is shown in the drawing by curves 1 or 2, is many times higher than the water retention power of glucose (curve 5) and lactose (curve 7), i.e. the starting materials used for preparing said agent as described in Examples 1 and 2 and also of the amino acid fraction of the skin (curve 6) and of glycerol (curve 4) given for comparison. It is interesting to note that the entire water-soluble skin extract (curve 3) has also a considerably lower water retention power than the reaction product "ZUK" or the skin sugar fraction according to the present invention.

The following examples serve to illustrate cosmetic compositions which have proved of value in imparting, or restoring, to skin smoothness and flexibility and in preventing, or retarding, the appearance of aging of the skin, without, however, limiting said examples thereto.

EXAMPLE 3

A skin cream is prepared in the usual manner in the form of an oil-in-water emulsion. Its composition is as follows:

20.0 g. of isopropyl ester of myristic acid,
6.0 g. of petrolatum (Vaseline),
4.0 g. of spermaceti,
3.0 g. of beeswax,
6.0 g. of tertiary wax alcohol phosphate,
0.4 g. of p-hydroxy benzoic acid ethyl ester,
3.0 g. of the mixture of 95 parts, by weight, of the reaction product of Example 1 and 5 parts, by weight, of the reaction product of Example 2, i.e. of the agent "ZUK,"
0.5 g. of perfume, and
57.1 g. of water.

EXAMPLE 4

A cleansing oil-in-water emulsion is prepared in the usual manner, for instance, by mixing the ingredients and cooling while stirring vigorously. Its composition is as follows:

12.0 g. of the isopropyl ester of palmitic acid,
2.0 g. of paraffinum subliquidum,
2.0 g. of sorbitan sequistearate,
3.0 g. of sucrose monopalmitate,
0.4 g. of p-hydroxy benzoic acid ethyl ester,
3.0 g. of the agent "ZUK,"
0.5 g. of perfume, and
77.1 g. of water.

EXAMPLE 5

A skin cream in the form of a water-in-oil emulsion is prepared in the usual manner. Its composition is as follows:

38.00 g. of the isopropyl ester of myristic acid,
6.00 g. of adeps lanae (wool fat),
12.50 g. of beeswax,
7.00 g. of petrolatum (Vaseline),
0.75 g. of cholesterol,
1.00 of sodium tetraborate,
0.65 g. of p-hydroxy benzoic acid ethyl ester,
3.00 g. of the agent "ZUK,"
0.70 g. of perfume, and
30.40 g. of water.

EXAMPLE 6

An after-shave lotion is prepared in the usual manner from the following components:

0.2 g. of lactic acid,
0.2 g. of butanol,
0.2 g. of the agent "ZUK,"
0.5 g. of perfume,
45.0 g. of pure 96%, by volume, ethanol, and
53.9 g. of water.

EXAMPLE 7

A face lotion is prepared in the usual manner from the following ingredients:

0.3 g. of lactic acid,
16.2 g. of distilled hamamelis extract,
0.3 g. of the agent "ZUK,"
0.3 g. of perfume,
30.0 g. of pure 96%, by volume, ethanol, and
59.9 g. of water.

EXAMPLE 8

A hair tonic is prepared in the usual manner from the following ingredients:

0.5 g. of salicylic acid,
0.2 g. of the agent "ZUK,"
0.6 g. of perfume,
50.0 g of isopropyl alcohol, and
48.7 g. of water.

These and other cosmetic compositions are capable of keeping the skin smooth and flexible due to their high water retention power. Thereby, the agent "ZUK" may be replaced by the skin sugar fraction, although this, in general, is not feasible due to the difficulty of obtaining such skin sugar fractions. It is evident from the above given examples that relatively small amounts of the water retaining agents are required. Amounts between about 0.1% and about 5.0% and preferably between about 0.2% and about 3% of the water retaining agent have proved to yield fully satisfactory results.

The preferred water retaining agent according to the present invention is characterized by being composed of the following main ingredients:

| | Percent |
|---|---|
| Mannose | Between 2.0 and 8.0. |
| Fructose | Between 25.0 and 50.0. |
| Glucose | Between 35.0 and 60.0. |
| Galactose | Between 1.0 and 3.0. |
| Degradation product of lactose | Between 0.5 and 4.5. |
| Lactose | Between 2.0 and 8.0. |

Of course, many changes and variations in the sugars subjected to the action of the alkaline agents, in the alkaline agent used for preparing the water retaining agents, in the reaction conditions, temperatures, duration, concentration of the reacting solutions, in the methods of purifying and working up the reaction mixture, in the composition of cosmetic preparations containing the water retaining agents, and the like may be made by those skilled in the art in accordance with the principles set forth herein and in the claims annexed thereto.

We claim:

1. [In a] *A* process [of] *for* producing a carbohydrate mixture having a high water retention power[, the steps which comprise] *and comprising* adding an aqueous alkali metal hydroxide solution to an aqueous solution of a carbohydrate selected from the group consisting of glucose, lactose, and a mixture of glucose and lactose, so as to adjust the pH-value of said carbohydrate solution to a pH of about 13.0, allowing the carbohydrate to react with said alkali metal hydroxide until the pH-value of the mixture has decreased to a pH of about 9.0, again adding the alkali metal hydroxide solution to the reaction mixture to adjust the pH-value of about 13.0, allowing the reaction to proceed until the pH-value of the mixture has decreased to a pH of about 9.0, and repeating said addition of the alkali metal hydroxide solution and reaction of the carbohydrate therewith at a pH between about 13.0 and about 9.0 until no further increase in the water retention power of the mixture of reaction products is achieved, and adjusting the pH-value of the reaction mixture to a pH of about 6.0. [to recover the reaction product from the reaction mixture].

2. The process according to claim 1, wherein the aqueous solution of an alkali metal hydroxide is a solution containing about 10% of sodium hydroxide.

3. The process according to claim 1, wherein the aqueous solution of a carbohydrate is a solution containing 20% to 30% of said carbohydrate.

4. The process according to claim 1, wherein the reaction temperature is between about 15° C. and about 30° C.

5. The process according to claim 1, wherein the carbohydrate solution is an aqueous glucose solution.

6. The process according to claim 1, wherein the carbohydrate solution is a lactose solution.

7. In a process of producing an agent of high water retention power, the steps which comprise adding an aqueous solution of an alkali metal hydroxide to an aqueous solution of glucose, allowing the mixture to react at a pH between about 9.0 and about 13.0, and acidifying the resulting reaction mixture to a pH of about 6.0, the proportion of glucose to alkali metal hydroxide in the reaction solution being adjusted so as to produce fructose in the resulting reaction mixture in an amount corresponding to about 40 parts of fructose for about 60 parts of glucose.

8. In a process of producing an agent of high water retention power, the steps which comprise adding an aqueous solution of an alkali metal hydroxide to an aqueous solution of lactose, allowing the mixture to react at a pH between about 9.0 and about 13.0, and acidifying the resulting reaction mixture to a pH of about 6.0, the proportion of lactose to alkali metal hydroxide in the reaction solution being adjusted so as to produce products of lactose degradation and transformation in the resulting reaction mixture in an amount corresponding to about 40 to 60 parts of said lactose degradation and transformation products for about 60 to 40 parts of lactose.

9. A carbohydrate mixture comprising the following main ingredients in the following proportions:

between about 2.0% and about 8.0% of mannose,
between about 25.0% and about 50.0% of fructose,
between about 35.0% and about 60.0% of glucose,
between about 0.5% and about 4.5% of a degradation product of lactose,
between about 1.0% and about 3.0% of galactose, and
between about 2.0% and about 8.0% of lactose, said mixture having a high water retention power.

10. The carbohydrate mixture according to claim 9, wherein the mixture comprises the following ingredients in the following proportions:

about 0.5% of psicose,
about 3.6% of mannose,
about 37.0% of fructose,
about 53.3% of glucose,
about 1.3% of galactose,
about 0.9% of a degradation product of lactose,
about 2.5% of lactose, and less than 0.3% of glutose and an unknown product designated as $U_2$.

11. The carbohydrate mixture according to claim 9, wherein the mixture comprises the following main ingredients in the following proportions:

about 3.0% of mannose,
about 31.1% of fructose,
about 46.7% of glucose,
about 2.1% of galactose,
about 6.5% of lactose,
about 0.2% of psicose,
about 3.1% of a degradation of lactose,
about 2.2% of glutose; and
about 4.7% of an unknown product designated as $U_1$.

*12. A process for producing a carbohydrate mixture having high water-retention power and which comprises the following steps:*

*a. reacting an aqueous solution of at least one carbohydrate selected from the group consisting of glucose and lactose at a temperature up to about 25° C. with an aqueous alkaline agent solution in a pH range between 9.0 and 13.0 until no further increase in water-retention power of the resulting admixture of reaction products is obtained, the pH decreasing within the stated range during the resulting reaction, and*

*b. adjusting the pH of said resulting admixture to a pH of about 6.0.*

*13. A process according to claim 12 for producing a carbohydrate mixture having high water-retention power and which comprises the following steps:*

*a. adding an aqueous alkaline agent solution to the aqueous carbohydrate solution until the pH value of the carbohydrate solution is about 13.0,*

*b. allowing the carbohydrate in said solution to react until the pH value in the resulting mixture is about 9.0,*

*c. adding more aqueous alkaline agent solution to said resulting mixture until the pH value thereof is about 13.0,*

*d. allowing a reaction to proceed in the thus-obtained mixture until the pH-value of said thus-obtained mixture is about 9.0,*

*e. repeating steps (c) and (d) alternately until no further increase in water-retention power of the resulting admixture of reaction products is achieved, and*

*f. adjusting the pH-value of said resulting admixture at a pH of about 6.0.*

*14. A stable (glucose and/or lactose)/(aqueous alkaline agent) reaction product which is a carbohydrate mixture and which, when applied to skin,*

*a. causes retention of water in the horny layer of the skin to which it is applied and*

*b. keeps the skin to which it is applied smooth and flexible in a manner comparable with such properties of the neutral skin sugar fraction.*

*15. A cosmetic composition having ingredient means for normalizing the water content of the stratum corneum and carrier therefor, the composition containing an effective concentration of the ingredient means for rendering skin, to which it is applied, smooth and flexible, the ingredient means having a pH of about 6.0 having high-water-retention power and being a reaction product of glucose and/or lactose with an alkaline agent.*

*16. A cosmetic composition according to claim 15 which is an oil-in-water emulsion.*

*17. A cosmetic composition according to claim 15 which is a water-in-oil emulsion.*

*18. A cosmetic composition according to claim 15, from* 0.1 to 5 percent by weight of which is the ingredient means.

* * * * *

UNITED STATES PATENT OFFICE

CERTIFICATE OF CORRECTION

Patent No. RE 28,781 Dated April 20, 1976

Inventor(s) JOACHIM KÖNIG and GÜNTER PADBERG

It is certified that error appears in the above-identified patent and that said Letters Patent are hereby corrected as shown below:
Title page, right column, under "OTHER PUBLICATION", "Wolfrom ... New York, N.Y." should read: --

Sowden, John C., and Schaffer, Robert, "The Reaction of D-Glucose, D-Mannose and D-Fructose in 0.035 *N* Sodium Hydroxide at 35°", *J. Am. Chem. Soc.*, volume 74, pages 449 to 504, January 20th, 1952.

Corbett, W.M., and Kenner, J., "The Degradation of Carbohydrates by Alkali - Part II", *J. Chem. Soc.*, pages 2245 to 2247, 1953.

Kenner, J., and Richards, G.N., "The Degradation of Carbohydrates by Alkali - Part IV", *J. Chem. Soc.*, pages 1784 to 1789, 1954.

Corbett, W.M., and Kenner, J., "The Degradation of Carbohydrates by Alkali - Part V", *J. Chem. Soc.*, pages 1789 to 1791, 1954.

Wolfrom, Melville L., "Advances in Carbohydrate Chemistry", volume 13, pages 63 to 69, Academic Press Inc., New York, N.Y., 1958.

Corbett, W.M., "The Alkaline Degradation of Glucose and of some of its Acetyl Derivatives", *J. Chem. Soc.*, pages 531 to 538, 1961.--

Column 3, line 66, "alkali and metal" should read --alkali metal--.
Column 10, line 46, "*6.0*" should read --*6.0*,--.

Signed and Sealed this

Seventh Day of December 1976

[SEAL]

*Attest:*

RUTH C. MASON
*Attesting Officer*

C. MARSHALL DANN
*Commissioner of Patents and Trademarks*